(12) United States Patent
Sotome

(10) Patent No.: US 6,880,989 B2
(45) Date of Patent: Apr. 19, 2005

(54) PUSH BUTTON SWITCH

(75) Inventor: Yusuke Sotome, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/749,410

(22) Filed: Jan. 2, 2004

(65) Prior Publication Data

US 2004/0141739 A1 Jul. 22, 2004

(30) Foreign Application Priority Data

Jan. 7, 2003 (JP) .................................. 2003-001476

(51) Int. Cl.[7] .............................................. G03B 17/38
(52) U.S. Cl. ...................... 396/502; 396/543; 200/345
(58) Field of Search ................................ 396/502, 543; 200/341, 343, 345

(56) References Cited

U.S. PATENT DOCUMENTS 3,186,319 A * 6/1965 Hochstein .................. 396/502
5,339,124 A * 8/1994 Harms ....................... 396/502
6,102,585 A * 8/2000 Kataoka et al. ............ 396/502
6,504,115 B1 * 1/2003 Nakai ......................... 200/6 A

FOREIGN PATENT DOCUMENTS

JP        2001-290200        10/2001

* cited by examiner

Primary Examiner—David M. Gray
(74) Attorney, Agent, or Firm—Greenblum & Bernstein, P.L.C.

(57) ABSTRACT

A push button switch includes a push button positioned on a switch base; a biasing member positioned between the push button and the switch base; a switching element having a press portion, the switching element being provided at a position offset from an axis of the push button; a press projection and a rocking projection which are formed on the push button on opposite sides of the center thereof; and a fulcrum formed on the switch base to be associated with the rocking projection. The rocking projection and the fulcrum are disengaged from each other when the push button is in a non-depressed position. The rocking projection comes into contact with the fulcrum when the push button is half depressed. The push button turns about the fulcrum when the push button is further depressed following the half depression of the push button.

11 Claims, 3 Drawing Sheets

PUSH BUTTON SWITCH

BACKGROUND OF THE INVENTION

1. Field of the Invention

The present invention relates to a push button switch suitable for, e.g., a shutter release mechanism of a camera.

2. Description of the Related Art

In typical conventional push button switches, a switching element and a push button are coaxially arranged so that a push stub of a push button, which is position on the axis of the push button, presses a press portion of the switching element when the push button is depressed. In the case where a return spring for returning the push button to its initial position after the push button is depressed is a coil spring, the coil spring is usually positioned around the push stub.

In the camera currently under development for the assignee of the present invention, a switching element cannot be arranged coaxially with respect to the push button due to the pursuit of further miniaturization of the camera.

SUMMARY OF THE INVENTION

The present invention provides a push button switch suitable for the case where a switching element cannot be arranged coaxially with respect to a push button.

The present invention provides such a push button switch which has a push button having a long stroke, e.g., a shutter release button of a camera for switching ON a first switch for photometering and a second switch for a shutter releasing operation when half depressed and fully depressed, respectively.

According to an aspect of the present invention, a push button switch is provided, including a push button positioned on a switch base to be supported thereby in a manner to prevent the push button from coming off the switch base; a biasing member positioned between the push button and the switch base at a substantially center of the push button to bias the push button in a direction away from the switch base; a switching element having a press portion, the switching element being provided at a position offset from an axis of the push button; a press projection and a rocking projection which are formed on the push button on opposite sides of the center thereof, respectively, the press projection projecting to be associated with the press portion of the switching element; and a fulcrum formed on the switch base to be associated with the rocking projection. The rocking projection and the fulcrum are disengaged from each other when the push button is in a non-depressed position. The rocking projection comes into contact with the fulcrum when the push button is half depressed. The push button turns about the fulcrum when the push button is further depressed following the half depression of the push button.

The biasing member can be a coil spring.

It is desirable for the half depression of the push button to cause the press projection to half press the press portion of the switching element so as to perform a first switching operation. It is desirable for the further depression of the push button, following the half depression of the push button, to cause the press projection to further press the press portion of the switching element so as to perform a second switching operation.

It is desirable for each of the fulcrum and the rocking projection to be elongated in a direction substantially orthogonal to a straight line connecting the center of the push button and the press projection of the push button.

It desirable for respective contacting surfaces of the press projection and the rocking projection, which come into contact with each other when the push button is half depressed, to be one and the other of a concave cylindrical surface and a convex cylindrical surface.

The push button can have an oval shape in plan view, and each of the press projection and the rocking projection can be elongated in a major axis of the push button.

It is desirable for the push button switch to be incorporated in a camera so that the push button serves as a shutter release button. The switch base can include an outer flange portion, a cylindrical portion and a bottom wall, in that order in a direction from top to bottom of the camera. The cylindrical portion can be fitted in a hole formed on an exterior wall of the camera.

It is desirable for the rocking projection to come into contact with the fulcrum while the press projection half presses the press portion of the switching element when the push button is half depressed, and for the push button to turn about the fulcrum so that the press projection fully presses the press portion of the switching element when the push button is fully depressed following the half depression of the push button.

It is desirable for the switching element to be positioned below the switch base, wherein a through hole is formed on the switch base so that the press projection can press the press portion of the switching element through the through hole when the push button is depressed.

It is desirable for the switching element to include a photometric switch and a release switch. The press projection half presses the press portion of the switching element to switch ON the photometric switch when the shutter release button is half depressed, and the press projection fully presses the press portion of the switching element to switch ON the release button when the shutter release button is fully depressed following the half depression of the shutter release button.

In an embodiment, a shutter release mechanism of a camera is provided, including a switch base having a recess which is fixed to an exterior wall of the camera; a shutter release button fitted in the recess to be freely movable in the recess along an axis of the shutter release button within a predetermined range of movement; a spring for biasing the shutter release button in a direction away from a bottom wall positioned at the bottom of the recess; a switching element positioned below the switch base, and having a press portion which is disposed at a position offset from an axis of the shutter release button; a press projection and a rocking projection which are formed on the shutter release button to project inwards, toward the bottom wall of the switch base, from opposite ends of the shutter release button, respectively, the press projection projecting so as to face the press portion of the switching element through a through hole formed on the switch base; and a fulcrum formed on the switch base to face the rocking projection. The rocking projection and the fulcrum are disengaged from each other when the shutter release button is in a non-depressed position. The rocking projection comes into contact with the fulcrum while the press projection half presses the press portion of the switching element when the shutter release button is half depressed. The shutter release button turns about the fulcrum while the press projection fully presses the press portion of the switching element when the shutter release button is fully depressed following the half depression of the shutter release button.

The present disclosure relates to subject matter contained in Japanese Patent Application No. 2003-001476 (filed on Jan. 7, 2003) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
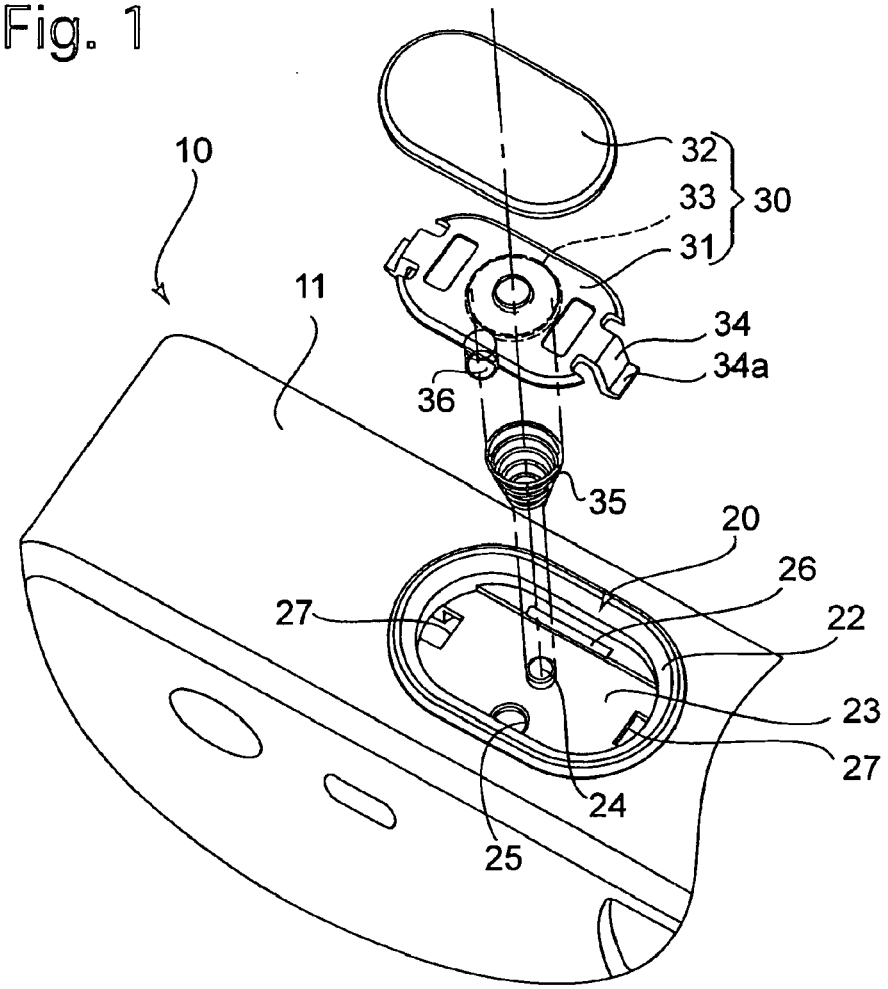
FIG. 1 is an exploded perspective view of an embodiment of a push button switch according to the present invention.

FIG. 1 shows an embodiment of a push button switch according to the present invention which serves as a shutter release mechanism of a camera. A through hole 12 is formed on an upper exterior member 11 of the camera 10 so that a switch base 20 made of synthetic resin is fitted in the through hole 12. The through hole 12 has an oval shape in plan view which is elongated in a horizontal direction of the camera 10. The switch base 20 is provided with an outer flange portion 22, a cylindrical portion 21 and a bottom wall 23, in that order in a direction from top to bottom of the camera 10. The cylindrical portion 21 has an oval shape in plan view which corresponds to that of the through hole 12. The outer flange 22 projects radially outwards from the upper end of the cylindrical portion 21 to form a rim around the upper edge of the through hole 12. The bottom wall 23 closes the lower end of the cylindrical portion 21. The bottom wall 23 is provided at substantially the center of an upper surface of the bottom wall 23 with a spring positioning stub 24. The bottom wall 23 is provided in front of the spring positioning stub 24 with a through hole 25, and is further provided, behind the spring positioning stub 24 on an upper surface of the bottom wall 23, with an elongated fulcrum 26 which is elongated in a horizontal direction of the camera 10. The elongated fulcrum 26 is formed as an elongated projection having a semi-cylindrical cross section to have a convex cylindrical surface on the elongated fulcrum 26. The elongated fulcrum 26 is elongated in a direction substantially orthogonal to a straight line connecting the spring positioning stub 24 with the through hole 25, and is also elongated in the direction of the major axis of the through hole 12 (the cylindrical portion 21). The switch base 20 is provided, at opposite ends of the bottom wall 23 in the direction of the major axis of the cylindrical portion 21, with a pair of engaging holes 27 which are formed over the lower edge of the cylindrical portion 21 and the bottom wall 23.

Figure 3:
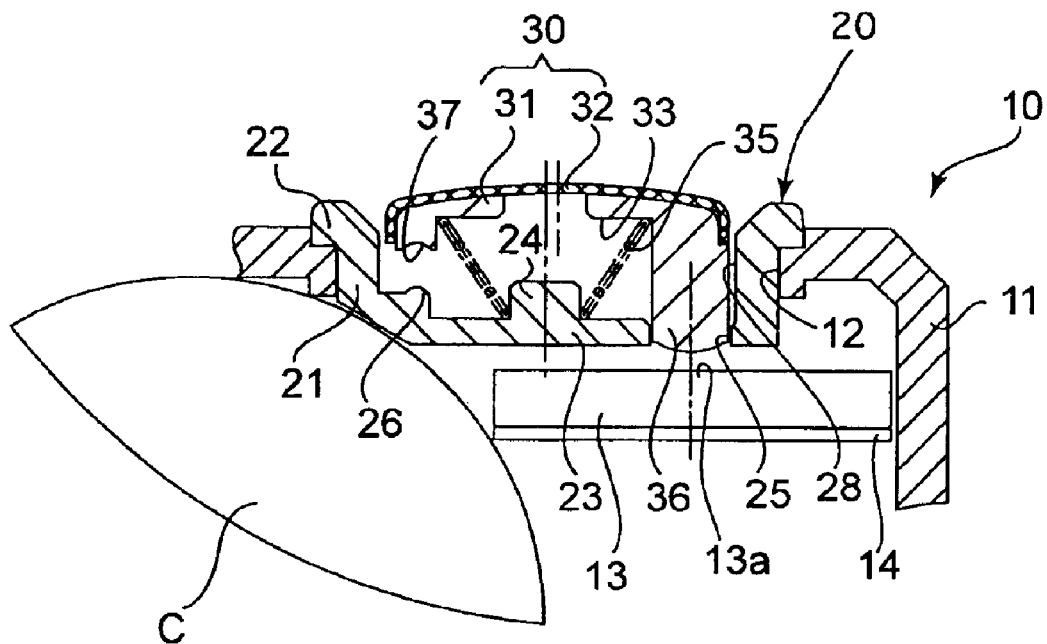
FIG. 3 is a cross sectional view taken along III—III line shown in FIG. 2, showing a non-operational state of the push button switch.
Figure 4:
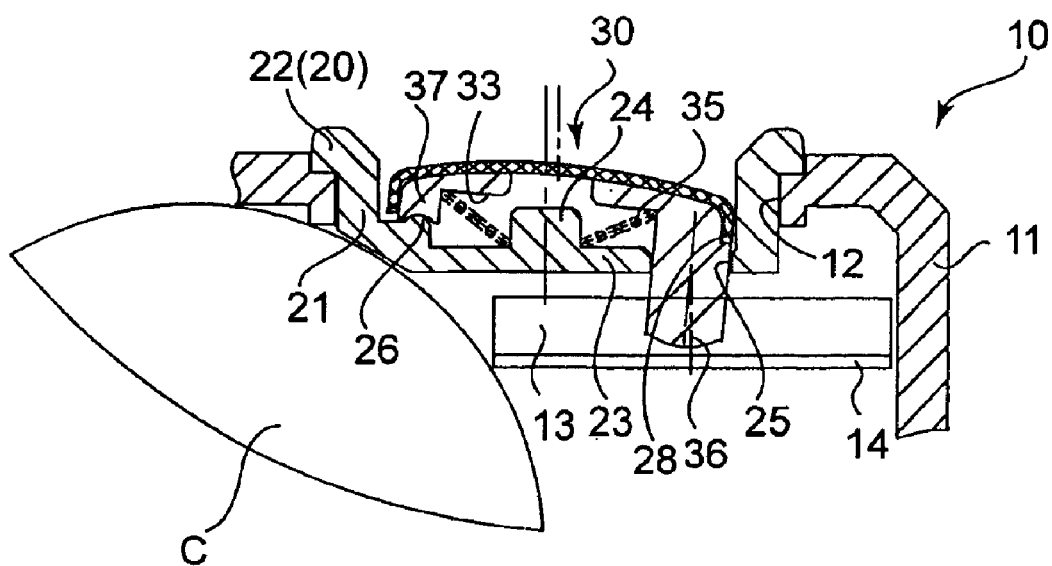
FIG. 4 is a cross sectional view taken along III—III line shown in FIG. 2, showing an operational state of the push button switch.
Figure 5:
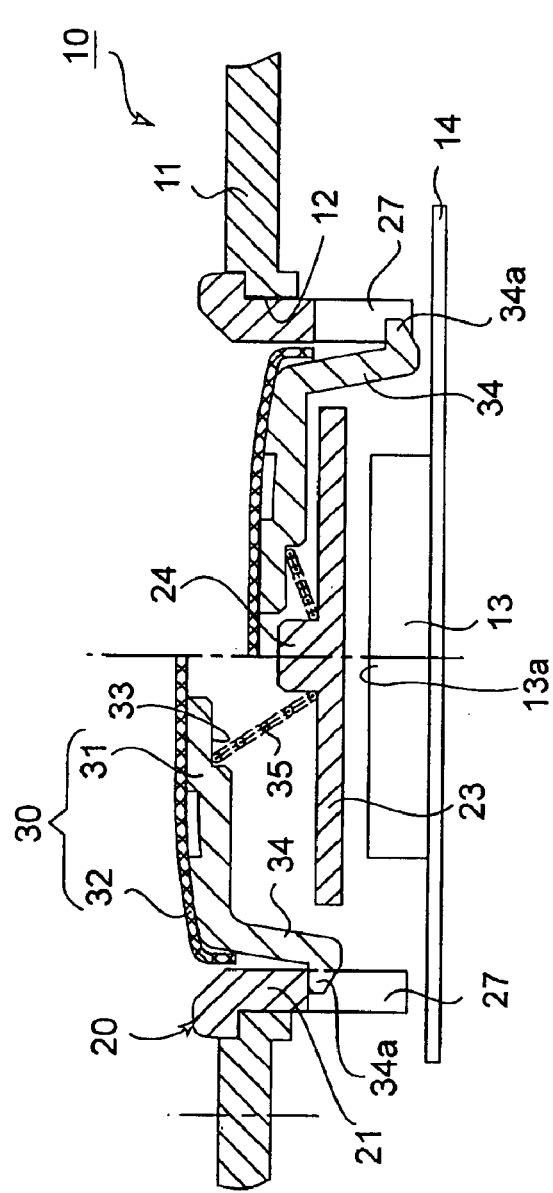
FIG. 5 is a cross sectional view taken along V—V line shown in FIG. 2.
Figure 6:
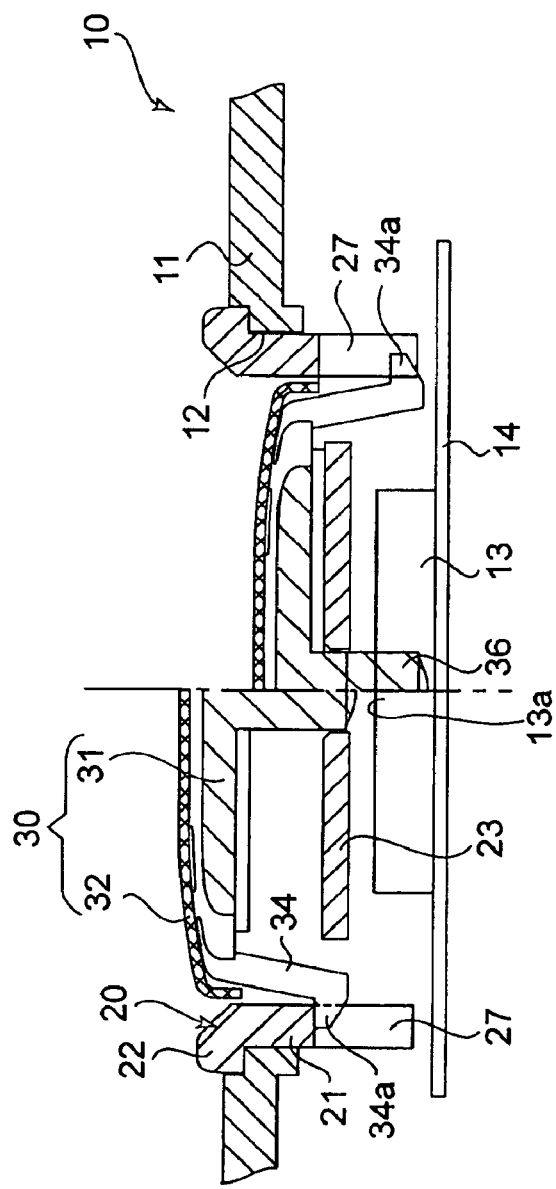
FIG. 6 is a cross sectional view taken along VI—VI line shown in FIG. 2.

The shutter release mechanism of the camera 10 is provided, inside the upper exterior member 11 immediately below the switch base 20, with a switching element 13 having tactile feedback which is fixed to an internal stationary portion of the camera 10. As shown in FIG. 3, the axis of the switching element 13 is offset from the axis of the through hole 12 (in a direction substantially orthogonal to a straight line connecting the spring positioning stub 24 with the through hole 25) so that a top center of the switching element 13 which is to be pressed with tactile feedback, i.e., a press portion 13a of the switching element 13, is positioned immediately below the through hole 25 of the bottom wall 23. The switching element 13 is electrically connected to a CPU (not shown) of the camera 10 via a flexible PWB 14. The switching element 13 includes two switches (not shown): a photometric switch and a release switch which are switched ON when the press portion 13a of the switching element 13 is half depressed and fully depressed, respectively. The camera 10 is provided therein immediately below the upper exterior member 11 with a cylindrical element (e.g., cylindrical capacitor) C (see FIGS. 3 and 4) which is elongated in a horizontal direction of the camera 10. The cylindrical element C is partly positioned immediately below the switch base 20 as shown in FIGS. 3 and 4, thus preventing the switching element 13 from being arranged coaxially with respect to the shutter release button 30 as a result of the pursuit of miniaturization of the camera 10.

The shutter release mechanism of the camera 10 is provided with a shutter release button (push button) 30. The shutter release button 30 is composed of a button body 31 and a button cap 32. The button body 31 is positioned inside the cylindrical portion 21 of the switch base 20, while the button cap 32 made of metal is cemented to a top surface of the button body 31. The button body 31 is made of synthetic resin, and has an oval shape in plan view which corresponds to that of the cylindrical portion 21. The button body 31 is provided, at a center of an under surface of a top wall of the button body 31, with a spring receiving recess (cylindrical recess) 33 which is recessed upwards, in a direction away from the spring positioning stub 24. The diameter of the spring receiving recess 33 is greater than the diameter of the spring positioning stub 24. The shutter release mechanism of the camera 10 is provided in the space between the bottom wall 23 and the button body 31 with a coil spring (return spring) 35 having a truncated cone shape so that a small-diameter end of the coil spring 35 is fitted on the spring positioning stub 24 while a large-diameter end of the coil spring 35 is fitted in the spring receiving recess 33. The coil spring 35 always biases the shutter release button 30 upwards, in a direction away from the bottom wall 23 of the switch base 20. On the other hand, the button body 31 is provided, at opposite ends thereof in a direction of the major axis of the oval-shaped button body 31, with a pair of engaging legs 34 which are engaged in the pair of engaging holes 27 to prevent the button body 31 from coming off the switch base 20. Each engaging leg 34 is provided at a tip thereof with a claw 34a which is engaged with the top end of the associated engaging hole 27 when the shutter release button 30 is positioned at the upper moving limit thereof with respect to the switch base 20. Namely, the claws 34a of the pair of engaging legs 34 determine the upper moving limit of the shutter release button 30 with respect to the switch base 20, i.e., prevent the button body 31 from coming off the switch base 20.

Figure 2:
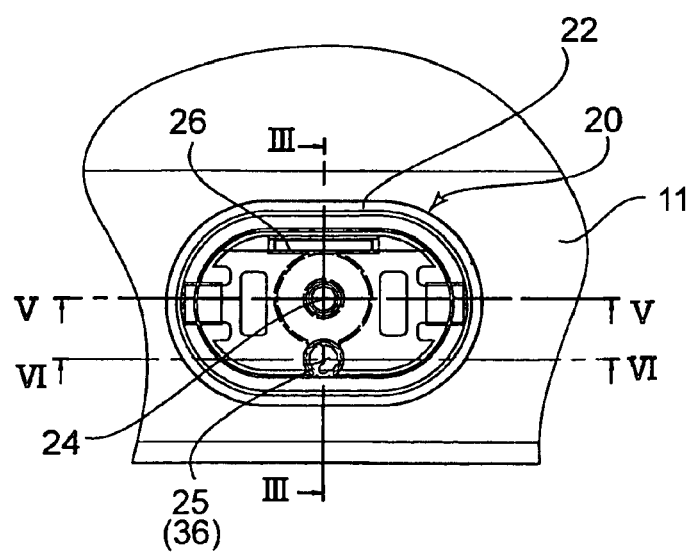
FIG. 2 is a plan view of the push button switch shown in FIG. 1 with a button cap of the push button switch removed.

The button body 31 is provided, on opposite sides of the spring receiving recess 33 in a direction of the minor axis of the button body 31 (in a vertical direction as viewed in FIG. 2), with a press projection 36 and an elongated rocking projection 37. The press projection 36 projects toward the switching element 13 so that the tip of the press projection 36 passes through the through hole 25 to face the press portion 13a of the switching element 13. The elongated rocking projection 37 is elongated in a direction parallel to the elongated fulcrum 26, and is formed to have a semi-cylindrical cross section to correspond to the shape of the elongated fulcrum 26. A lower end surface of the elongated rocking projection 37, which comes into contact with the convex cylindrical surface of the elongated fulcrum 26 when the shutter release button 30 is depressed, is formed as a concave cylindrical surface.

As shown in FIG. 3, the elongated rocking projection 37 and the elongated fulcrum 26 are disengaged from each other when the shutter release button 30 is in a non-depressed position where the shutter release button 30 does not sink into the cylindrical portion 21 of the switch base 20. The elongated rocking projection 37 comes into contact with the elongated fulcrum 26 and subsequently the shutter release button 30 turns about the elongated fulcrum 26 (the elongated rocking projection 37) when the shutter release button 30 is depressed as shown in FIG. 4. The cylindrical portion 21 of the switch base 20 is provided on an inner peripheral surface thereof with a clearance recess 28 (see FIGS. 3 and 4) which is recessed toward the front of the camera 10 (rightward as viewed in FIGS. 3 and 4) to allow the shutter release button 30 to turn about the elongated fulcrum 26 (the elongated rocking projection 37) while the axis of the shutter release button 30 tilts as shown in FIG. 4.

Accordingly, in the above illustrated embodiment of the shutter release mechanism of the camera 10, the shutter release button 30, which is biased in a direction away from the bottom wall 23 of the switch base 20 by the coil spring 35, is held in the non-depressed position by the engagement of the pair of engaging legs 34 with the pair of engaging holes 27 while the press projection 36 is disengaged from the switching element 13 in a state where the shutter release button 30 is not depressed, i.e., the shutter release button 30 is in a free state as shown in FIG. 3.

When the shutter release button 30 is depressed against the spring force of the coil spring 35, firstly the elongated rocking projection 37 comes into contact with the elongated fulcrum 26. This simple depression of the shutter release button 30 causes the press projection 36 to half depress the press portion 13a of the switching element 13 to thereby switch ON the photometric switch of the switching element 13. Subsequently, when the shutter release button 30 is further depressed (fully depressed) following the half depression of the shutter release button 30, the shutter release button 30 turns about the elongated fulcrum 26 (the elongated rocking projection 37) to consequently fully press the press portion 13a of the switching element 13. This switches ON the release switch. When the shutter release button 30 is fully depressed, a portion of the shutter release button 30 enters the clearance recess 28 as shown in FIG. 4.

Since the shutter release button 30 is always biased in a direction away from the bottom wall 23 of the switch base 20 by the coil spring 35 that is positioned in the center of the shutter release button 30, a linear depression of the shutter release button 30 is sensed by the user when the shutter release button 30 is firstly half depressed. Subsequently, when the shutter release button 30 is fully depressed after the elongated rocking projection 37 comes into contact with the elongated fulcrum 26, a non-linear depression of the shutter release button 30 is sensed by the user that is slightly different from the previous sensed touch because the shutter release button 30 turns about the elongated fulcrum 26 (the elongated rocking projection 37). However, no unnatural/uncomfortable sense of touch is felt by the user because the angle of rotation of the shutter release button 30 about the elongated fulcrum 26 (the elongated rocking projection 37) is only approximately a few degrees.

As can be understood from the above descriptions, the push button switch according to the present invention is suitable for a push button switch with a long stroke, e.g., a shutter release mechanism of a camera. However, the push button switch according to the present invention can be applied to a push button switch for any other type electronic equipment.

As can be understood from the foregoing, according to the present invention, a push button switch suitable for the case where a switching element cannot be arranged coaxially with respect to a push button is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A push button switch comprising:

a push button positioned on a switch base to be supported thereby in a manner to prevent said push button from coming off said switch base;

a biasing member positioned between said push button and said switch base at a substantially center of said push button to bias said push button in a direction away from said switch base;

a switching element having a press portion, said switching element being provided at a position offset from an axis of said push button;

a press projection and a rocking projection which are formed on said push button on opposite sides of said center thereof, respectively, said press projection projecting to be associated with said press portion of said switching element; and a fulcrum formed on said switch base to be associated with said rocking projection, wherein said rocking projection and said fulcrum are disengaged from each other when said push button is in a non-depressed position, wherein said rocking projection comes into contact with said fulcrum when said push button is half depressed, and wherein said push button turns about said fulcrum when said push button is further depressed following said half depression of said push button.

2. The push button switch according to claim 1, wherein said biasing member comprises a coil spring.

3. The push button switch according to claim 1, wherein said half depression of said push button causes said press projection to half press said press portion of said switching element so as to perform a first switching operation, and wherein said further depression of said push button, following said half depression of said push button, causes said press projection to further press said press portion of said switching element so as to perform a second switching operation.

4. The push button switch according to claim 1, wherein each of said fulcrum and said rocking projection is elongated in a direction substantially orthogonal to a straight line connecting said center of said push button and said press projection of said push button.

5. The push button switch according to claim 4, wherein respective contacting surfaces of said press projection and said rocking projection, which come into contact with each other when said push button is half depressed, are one and the other of a concave cylindrical surface and a convex cylindrical surface.

6. The push button switch according to claim 4, wherein said push button has an oval shape in plan view, and wherein each of said press projection and said rocking projection is elongated in a major axis of said push button.

7. The push button switch according to claim 1, wherein said push button switch is incorporated in a camera so that said push button serves as a shutter release button, wherein said switch base comprises an outer flange portion, a cylindrical portion and a bottom wall, in that order in a direction from top to bottom of said camera, and wherein said cylindrical portion is fitted in a hole formed on an exterior wall of said camera.

8. The push button switch according to claim 1, wherein said rocking projection comes into contact with said fulcrum while said press projection half presses said press portion of said switching element when said push button is half depressed, and wherein said push button turns about said fulcrum so that said press projection fully presses said press portion of said switching element when said push button fully depressed following said half depression of said push button.

9. The push button switch according to claim 1, wherein said switching element is positioned below said switch base, wherein a through hole is formed on said switch base so that said press projection can press said press portion of said switching element through said through hole when said push button is depressed.

10. The push button switch according to claim 7, wherein said switching element comprises a photometric switch and a release switch, and wherein said press projection half presses said press portion of said switching element to switch ON said photometric switch when said shutter release button is half depressed, and wherein said press projection fully presses said press portion of said switching element to switch ON said release button when the shutter release button is fully depressed following said half depression of said shutter release button.

11. A shutter release mechanism of a camera, comprising:

a switch base having a recess which is fixed to an exterior wall of said camera;

a shutter release button fitted in said recess to be freely movable in said recess along an axis of said shutter release button within a predetermined range of movement;

a spring for biasing said shutter release button in a direction away from a bottom wall positioned at the bottom of said recess;

a switching element positioned below said switch base, and having a press portion which is disposed at a position offset from an axis of said shutter release button;

a press projection and a rocking projection which are formed on said shutter release button to project inwards, toward said bottom wall of said switch base, from opposite ends of said shutter release button, respectively, said press projection projecting so as to face said press portion of said switching element through a through hole formed on said switch base; and a fulcrum formed on said switch base to face said rocking projection, wherein said rocking projection and said fulcrum are disengaged from each other when said shutter release button is in a non-depressed position, wherein said rocking projection comes into contact with said fulcrum while said press projection half presses said press portion of said switching element when said shutter release button is half depressed, and wherein said shutter release button turns about said fulcrum while said press projection fully presses said press portion of said switching element when the shutter release button is fully depressed following said half depression of said shutter release button.

* * * * *